(12) United States Patent
Cardenas

(10) Patent No.: US 10,106,003 B2
(45) Date of Patent: Oct. 23, 2018

(54) TRAILER HITCH

(71) Applicant: Daniel Gustavo Cardenas, Marietta, GA (US)

(72) Inventor: Daniel Gustavo Cardenas, Marietta, GA (US)

( * ) Notice: Subject to any disclaimer, the term of this patent is extended or adjusted under 35 U.S.C. 154(b) by 129 days.

(21) Appl. No.: 15/216,763

(22) Filed: Jul. 22, 2016

(65) Prior Publication Data

US 2018/0022176 A1 Jan. 25, 2018

(51) Int. Cl.
*B60D 1/64* (2006.01)
*B60D 1/24* (2006.01)
*B60D 1/06* (2006.01)

(52) U.S. Cl.
CPC ............. *B60D 1/64* (2013.01); *B60D 1/06* (2013.01); *B60D 1/24* (2013.01)

(58) Field of Classification Search
CPC .............. B60D 1/06; B60D 1/24; B60D 1/64
USPC ........................................................ 280/422
See application file for complete search history.

(56) References Cited

U.S. PATENT DOCUMENTS

| | | | | |
|---|---|---|---|---|
| 3,328,741 A | * | 6/1967 | Brown | ............... B60D 1/065 280/422 |
| 8,308,181 B2 | * | 11/2012 | Riibe | .................. B60D 1/62 280/422 |

* cited by examiner

*Primary Examiner* — Joseph M Rocca
*Assistant Examiner* — Felicia L. Brittman
(74) *Attorney, Agent, or Firm* — H. Jay Spiegel

(57) ABSTRACT

A ball-type hitch half is mounted on a towing vehicle, and a socket is mounted on a pivotable arm attached to the towed vehicle. The socket includes a shoulder surrounding the socket including a plurality of radially spaced pins. The ball has a neck that extends downward. Surrounding the neck is a peripheral collar on which a plurality of arcuately extending electrical contacts are provided. The pins surrounding the socket on its peripheral shoulder are spring biased in the downward direction such that they are forced into engagement with the arcuate contacts on the collar which is spring biased upward. When the socket is installed and locked over the ball, the contact pins are spring biased into contact with the arcuate electrical contact areas such that for any rotative or pivoted position of the towed vehicle with respect to the towing vehicle, the pins maintain contact with the arcuate contacts.

19 Claims, 4 Drawing Sheets

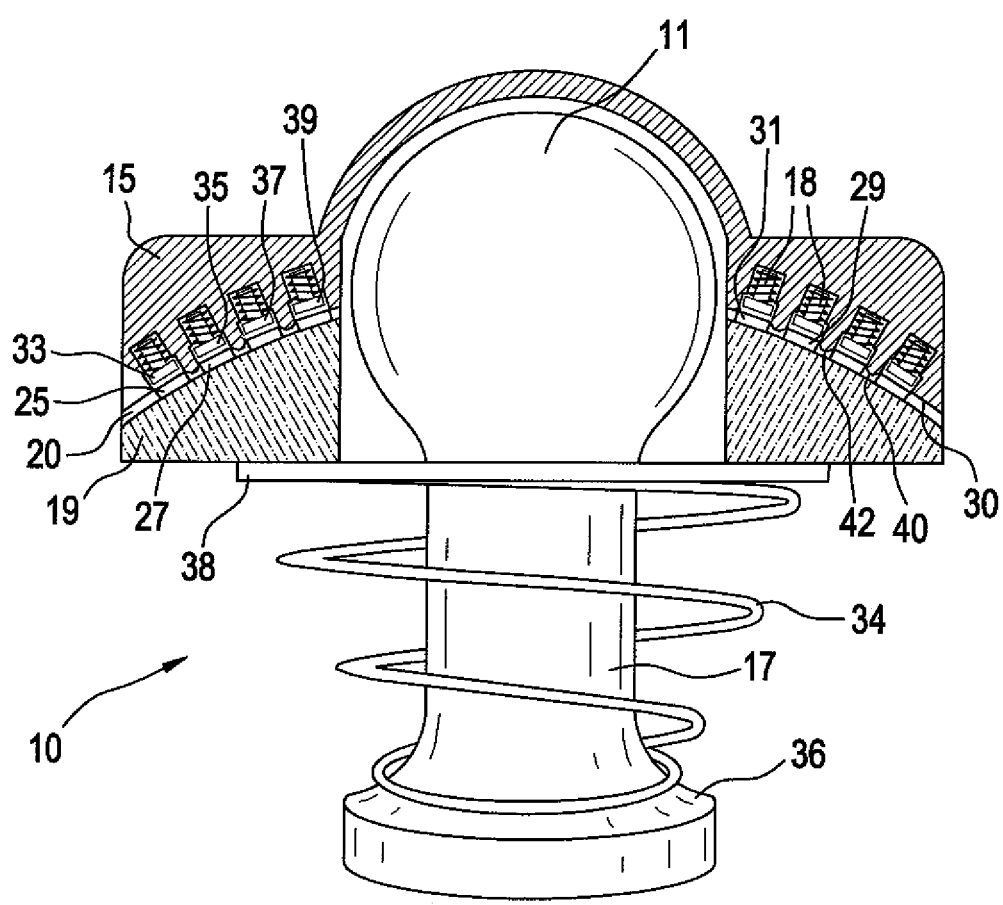

TRAILER HITCH

BACKGROUND OF THE INVENTION

The present invention relates to an improved trailer hitch. In the prior art, trailer hitches in which a ball is located on the towing vehicle and a socket located on the towed vehicle is coupled with the ball are notoriously well known in the prior art. In such devices, the socket, may rotate with respect to the ball as the towing vehicle goes around corners and the angular relationship between the ball and socket may also vary as the towing vehicle transitions from a flat surface to an incline or decline. Under these scenarios, the socket is designed to maintain its coupled relationship with the ball to prevent the towed vehicle from releasing from the towing vehicle.

In the prior art, typically, where a ball and socket coupling is employed, electrical connections must be provided between the towing vehicle and the towed vehicle. Examples of such electrical connections facilitate providing the towed vehicle with turn signals, brake lights, back up lights, and other lights that illuminate when the headlights of the towing vehicle are activated. Electrical connections allow these functions of the towed vehicle such as a trailer to be controlled from the towing vehicle. An example of such connections is shown identified by reference numerals 25 and 26 in FIG. 1 of U.S. Pat. No. 7,581,746 to Abate et al.

Abate et al. also teach electrical connectors between the towed and towing vehicle including pins engaging concentric rings as illustrated in FIGS. 11A and 11B. These connectors are not incorporated into the ball and socket but are separately provided.

U.S. Pat. No. 3,858,907 to Van Raden discloses a ball and socket mechanical and electrical trailer hitch in which electrical connections are incorporated into the ball and the socket. This configuration is unreliable because in transitions between horizontal roadways and hills and valleys, the electrical connections can become misaligned and lose electrical contact, thereby rendering inoperative turn signals, brake lights, backing lights, and rear lights illuminated when headlights are activated.

The same is true of the configuration set forth in U.S. Pat. No. 4,283,072 to Deloach, Jr. In that device, rotations and pivoting of the socket with respect to the ball can result in disconnects between the circuits. It is not feasible for the socket to be precluded from pivoting with respect to the ball and such pivoting can easily break the electrical contacts.

The present invention differs from the teachings of the prior art known to Applicant by providing the electrical contacts on a shoulder peripheral of the socket and a collar peripheral of the ball in such a manner that the contacts between the towing vehicle and the towed vehicle are maintained regardless of the rotative orientation about horizontal or vertical axes.

SUMMARY OF THE INVENTION

The present invention relates to an improved trailer hitch. The present invention includes the following interrelated objects, aspects and features:

(1) In a first aspect, the present invention includes a ball-type hitch half mounted on a vehicle that is intended to be a towing vehicle. A socket is mounted on a pivotable arm attached to the towed vehicle which may, for example, be a trailer, camper or other towed vehicle.

(2) The socket includes a peripheral shoulder surrounding the socket which includes a plurality of radially spaced downwardly directed spring biased pins which are also spaced about the circumference of the shoulder.

(3) The ball has a neck that extends downward to a point of attachment to the towing vehicle. Surrounding the neck is a peripheral floating, upwardly biased collar on which a plurality of arcuately extending electrical contacts are provided.

(4) The pins surrounding the socket on its peripheral shoulder are spring biased in the downward direction such that they are forced into engagement with the arcuate contacts on the collar. In one embodiment of the present invention, there are four sets of arcuate contacts concentric with one another with each set including two diametrically opposed arcs of contact material which are spaced from one another by small gaps such as, for example, 30° of the circumference. This spacing is chosen because a towed vehicle will never turn more than 70° with respect to the towing vehicle, because the trailer arm would hit the bumper of the towing vehicle at a greater angle. Each set of arcuate contacts is spaced from an adjacent arcuate set of contacts by a prescribed radial distance corresponding to the radial spacing between the contact pins. Each set of arcuate contacts can facilitate connection of electrical circuits for two separate functions, thus providing eight separate functions including tail lights, turn signals, backing lights, brake lights, running lights like license plate lights, camera, and distance sensor, among others.

(5) With this configuration, when the socket is installed and locked over the ball, the contact pins are spring biased into contact with the arcuate electrical contact areas such that for any rotative position of the towed vehicle with respect to the towing vehicle, the pins maintain contact with the arcuate contacts. Additionally, given the reciprocating ability of the pins and the fact that they are spring biased in the downward direction as well as the upward spring bias of the collar, the pins maintain contact with the arcuate contacts regardless of the vertical orientation of the towing vehicle with respect to the towed vehicle. Thus, in transitions between level ground and uphill areas as well as transitions between level ground and downhill areas as well as transitions from uphill or downhill areas to flat areas, changes in orientation of the socket with respect to the ball do not cause electrical contact to be removed between the pins and the arcuate contacts. In this regard, the pins may extend out or retract as needed to maintain the pins in contact with the arcuate contacts.

As such, it is a first object of the present invention to provide an improved trailer hitch.

It is a further object of the present invention to provide such an improved trailer hitch in which a ball is mounted on a towing vehicle and a socket is mounted on a towed vehicle.

It is a further object of the present invention to provide such a device in which a peripheral shoulder surrounds the socket and carries a plurality of radially and circumferentially spaced pins which are spring biased in the downward direction.

It is a yet further object of the present invention to provide such a device in which a collar peripheral of the ball includes a plurality of arcuate contacts that are radially spaced from one another and configured so that each set of arcuate contacts engages one pair of spring biased pins regardless of the rotative or angular relationship between the ball and socket.

It is a yet further object of the present invention to provide such a device in which firm electrical contact is always maintained between the pins and arcuate contacts.

These and other objects, aspects and features of the present invention will be better understood from the following detailed description of the preferred embodiment when read in conjunction with the appended drawing figures.

BRIEF DESCRIPTION OF THE DRAWINGS

FIG. 5 shows a side view of some details of the inventive hitch.

SPECIFIC DESCRIPTION OF THE PREFERRED EMBODIMENT

Figure 1:
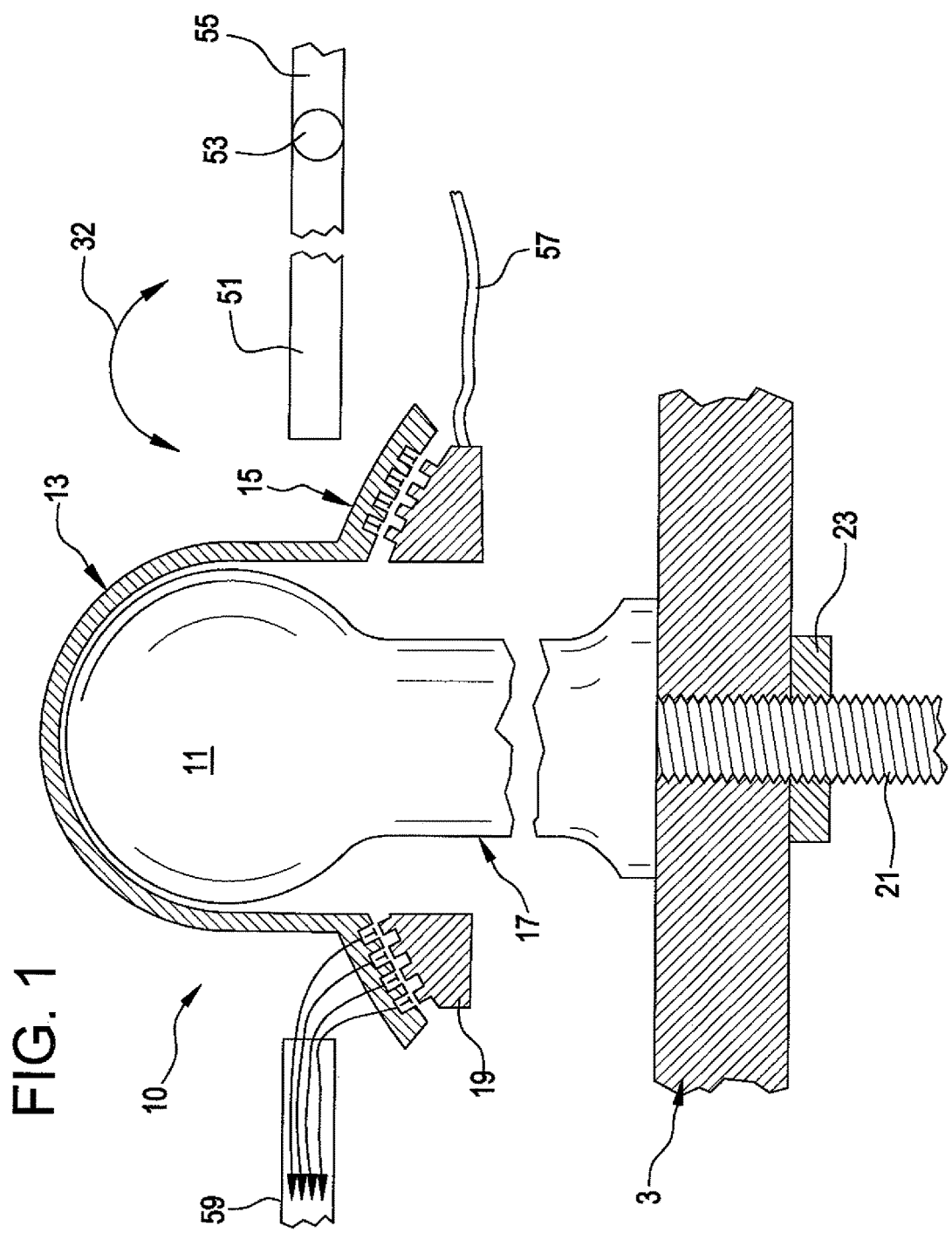
FIG. 1 shows a side view partially in cross-section of the inventive trailer hitch, with certain components omitted which are shown in FIG. 5.

With reference to FIGS. 1-5, the present invention is generally designated by the reference numeral 10 and is seen to include a ball 11 and a socket 13. The socket 13 depends downwardly and merges with a peripheral shoulder 15 that extends about the periphery of the socket 13.

The ball 11 connects to a neck 17 that depends downwardly from the ball 11. Surrounding the neck is a radially outwardly extending floating collar 19. The ball 11 has an elongated threaded stem 21 that is attached to structure 3 from the associated towing vehicle (not shown) including the use of a threaded fastener 23 that threads over the threaded stem 21 and engages the underside of the structure 3 to securely fasten the ball 11 to the associated towing vehicle. See FIG. 1.

Figure 2:
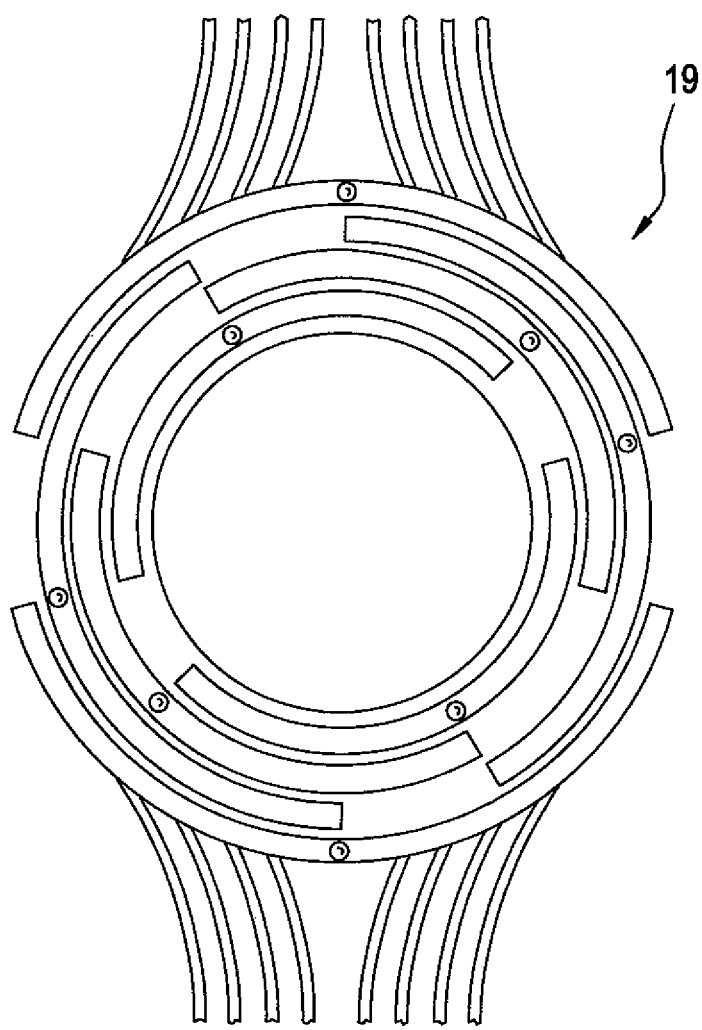
FIG. 2 shows a top view of the collar on which are located arcuate electrical contacts, with images of pins schematically superimposed thereover.
Figure 3:
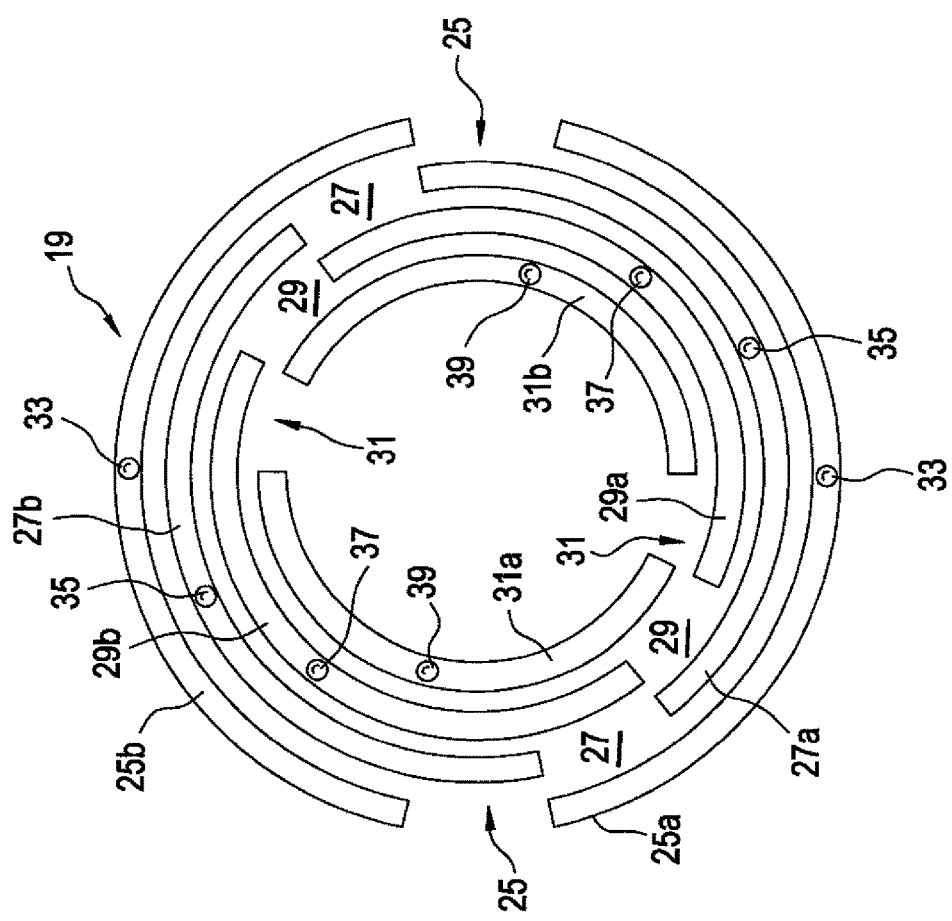
FIG. 3 shows an enlarged view of the arcuate contacts and superimposed pins shown in FIG. 2.

With particular reference to FIGS. 2, 3 and 5, the collar 19 is seen in more detail. As best seen in FIGS. 2 and 3, a plurality of concentric electrical contacts are provided on an upper surface of the collar 19. Each arcuate electrical contact is discontinuous. The contacts are mounted on a part spherical upper surface 20 (FIG. 5) of the collar.

With reference to FIGS. 2 and 3, the electrical contacts include outer first contacts 25a and 25b spaced from one another by the spacings 25. Concentrically within the contacts 25a and 25b are contacts 27a and 27b which are spaced from one another by spacings 27. Concentrically inward from the contacts 27a and 27b are arcuate contacts 29a and 29b which are spaced from one another by spacings 29. Finally, the innermost arcuate contacts are designated by the reference numerals 31a and 31b and are spaced from one another by spacings 31. The spacings 25, 27, 29 and 31 may each be about 30° of the circumference of the collar 19. This spacing is chosen because a towed vehicle will never turn more than 70° with respect to the towing vehicle, because the trailer arm would hit the bumper of the towing vehicle at a greater angle.

FIGS. 2 and 3 show superimposed images of pins that engage the electrical contacts described above. Thus, pairs of pins 33 engage the contacts 25a and 25b; pairs of pins 35 engage the arcuate contacts 27a and 27b; pairs of pins 37 engage the arcuate contacts 29a and 29b; finally, pairs of pins 39 engage the arcuate contacts 31a and 31b.

Figure 4:
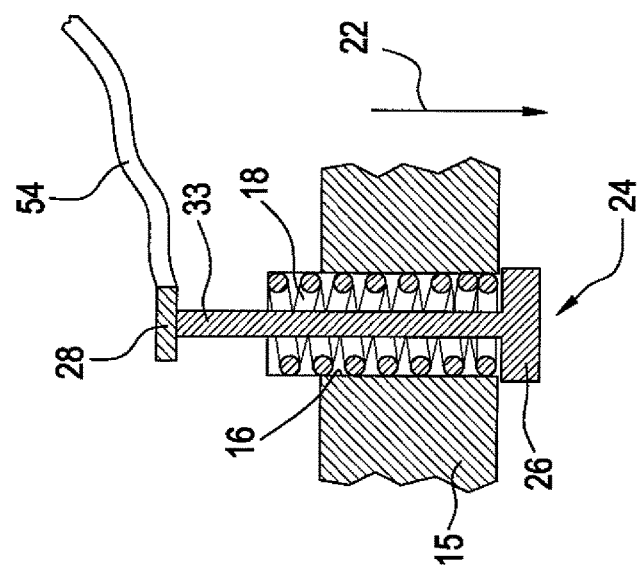
FIG. 4 shows a side view partially in cross-section of the structure enabling the pins to reciprocate.

With reference to FIG. 4, details of a contact pin are shown. The shoulder 15 is partially shown and has a recess 16 in which a pin, for example, the pin 33 is shown. The recess 16 contains a coil spring 18 which biases the pin 33 in the direction of the arrow 22. The pin 33 has an enlarged bottom 24 with a surface 26 designed to engage one of the arcuate contacts best seen in FIGS. 2 and 3. The proximal end of the pin 33 may have a stop 28 that limits the movement of the pin 33 in the direction of the arrow 22. As shown in FIG. 5, the stop may comprise the end of a blind bore in which each pin is contained. An electrical conductor 54 is attached to the pin 33.

As should be understood from FIG. 4, in the view of FIG. 1, the pins are biased in the downward direction into engagement with the respective arcuate contacts on the shoulder 19. As should also be understood, as the socket 13 pivots in the direction of the arrow 32 in the view of FIG. 1 resulting from the towing vehicle transitioning from a flat surface to an upward or downward surface or vice-versa, the spring 18 allows the pin to extend and retract as needed to maintain the contact surface 26 in direct contact with an arcuate contact as seen in FIGS. 2 and 3 regardless of the orientation of the socket 13 with respect to the ball 11. The pins extend from a part spherical surface 30 (FIG. 5) that engages the part spherical surface 20 on the collar 19.

Of course, if desired, the ball 11 may be located on the towed vehicle and the socket 13 may be located on the towing vehicle, although it is customary for the ball 11 to be located on the towing vehicle and the socket 13 to be located on the towed vehicle.

As seen in FIG. 1, the socket 13 is attached at the shoulder 15 to an arm 51 that is attached to a pivot 53 attached to structure 55 of the towed vehicle such as a trailer. In this way, the socket 13 can be pivoted upwardly in the view of FIG. 1 to remove it from the ball 11 and to be pivoted downwardly in the view of FIG. 1 to be coupled to the ball 11. Locking structure not shown in the figures but well known to those skilled in the art is used to lock the socket 13 over the ball 11 in the position shown in FIG. 1.

With further reference to FIG. 1, an electrical conductor 57 is seen emanating from the collar 19 and includes, for example, four or eight wires as shown electrically connected to the various arcuate contacts best seen in FIGS. 2 and 3. Similarly, an additional electrical conductor 59 is seen which is connected to the towing vehicle and includes, for example, eight wires, one connected to each of the pins. In the example shown, there are four or eight wires, four pairs of pins, and four sets of two arcuate conductors, each consisting of two circumferentially spaced arcuate sections. This number of components permits interconnection between the towing vehicle and the towed vehicle or trailer of up to eight electrical components including brake lights, lights that illuminate when the headlights of the towing vehicle are illuminated, as well as turn signal lights and lights indicating that the towing vehicle and towed vehicle are being moved in the reverse direction as well as running lights, license plate lights, backup camera, and distance sensor, among others. Of course, this number of components is exemplary and the number of pins, arcuate conductors, and wires may be chosen as desired to facilitate interconnection between the towing vehicle and the towed vehicle of any number of electrical components.

As particularly seen in FIG. 5, the collar 19 surface 20 on which the arcuate conductors are located is part spherical in nature which is specifically devised to facilitate pivoting movements of the socket 13 with respect to the ball 11 while maintaining electrical contact between pins that are carried on the part spherical surface 30 of the shoulder 15 and arcuate conductors. If the collar 19 and shoulder 15 did not have engaging part spherical surfaces, there would be no ability of the socket 13 to pivot with respect to the ball 11 while maintaining electrical contact between the pins and arcuate conductors. The pins are devised to have a long enough "throw," in other words can extend a sufficiently long enough distance to accommodate any angular movements of the socket 13 with respect to the ball 11. It is noted that such angular movements are also permitted by virtue of the pivot 53. Additionally, a large coil compression spring 34 (FIG. 5) is located between the hub 36 and a plate 38 under the collar 19 to spring bias the collar 19 upward to help maintain electrical contact between the pins on the shoulder 15 and the arcuate conductors on the collar 19, regardless of the rotative or pivoted orientation of the socket 13 with respect to the ball 11. As seen in FIG. 5, downwardly depending circumferentially extending projections 40 enter recesses 42 between adjacent arcuate conductors to maintain alignment between respective pins and conductors.

If desired, the electrical connector aspects of the invention may be reversed, with upwardly directed spring biased pins being on an upwardly biased collar surrounding the ball and the shoulder having downwardly facing arcuate electrical conductors connected peripheral of the socket.

As such, an invention has been disclosed in terms of a preferred embodiment thereof which fulfills each and every one of the objects of the invention as set forth hereinabove, and provides a new and useful improved trailer hitch of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

The invention claimed is:

1. An improved trailer hitch, comprising:
   a) a ball attachable to a vehicle via a neck and fastener;
   b) a collar surrounding said ball extending radially outwardly from said ball and peripherally of said ball;
   c) at least one arcuate electrical conductor attached on an upper surface of said collar;
   d) a socket attachable to another vehicle;
   e) a shoulder peripherally attached to said socket and bearing at least one pin facing downward and biased downwardly;
   f) said socket being coupleable to said ball and when so coupled, said at least one pin engages said at least one arcuate electrical conductor through a variety of horizontal and vertical orientations of said ball with respect to said socket.

2. The improved trailer hitch of claim 1, wherein said collar has a part spherical surface on which said at least one arcuate electrical conductor is carried.

3. The improved trailer hitch of claim 1, wherein each pin is biased downwardly by a compression spring.

4. The improved trailer hitch of claim 1, wherein each pin has a flat lower contact surface.

5. The improved trailer hitch of claim 1, wherein said at least one arcuate electrical conductor comprises two arcuate sections with circumferentially extending spacings therebetween.

6. The improved trailer hitch of claim 1, wherein said at least one arcuate electrical conductor comprises plural radially spaced circumferentially extending arcuate electrical conductors.

7. The improved trailer hitch of claim 6, wherein said at least one pin comprises a plurality of pins corresponding in number to a number of said plural radially spaced circumferentially extending arcuate electrical conductors.

8. The improved trailer hitch of claim 6, wherein said at least one pin comprises two pins for each of said plural radially spaced circumferentially extending arcuate electrical conductors.

9. The improved trailer hitch of claim 8, wherein each of said number of pins is located to engage one of said arcuate sections, said pins being carried on a downwardly facing part spherical surface on said shoulder.

10. The improved trailer hitch of claim 1, wherein said at least one arcuate electrical conductor comprises four radially spaced circumferentially extending conductors.

11. The improved trailer hitch of claim 10, wherein said at least one pin comprises four pins, one pin aligned with each conductor.

12. The improved trailer hitch of claim 11, wherein each pin-conductor set facilitates conveyance of electrical current to one of brake lights, tail lights, turning signals or backing lights on said another vehicle.

13. The improved trailer hitch of claim 12, wherein said collar has a part spherical surface on which said at least one arcuate electrical conductor is carried.

14. The improved trailer hitch of claim 11, wherein each pin is biased downwardly by a compression spring.

15. An improved trailer hitch, comprising:
   a) a ball attachable to a vehicle via a neck and fastener;
   b) a collar surrounding said ball extending radially outwardly from said ball and peripherally of said ball, said collar being spring biased upwardly;
   c) a plurality of radially spaced arcuate electrical conductors attached on an upper part spherical surface of said collar;
   d) a socket attachable to another vehicle;
   e) a shoulder peripherally attached to said socket and bearing a plurality of radially spaced pins corresponding in number with said plurality of radially spaced arcuate electrical conductors and facing downward from a part spherical surface of said shoulder and spring biased downwardly, each pin engaging a respective one of said radially spaced arcuate electrical conductors;
   f) said socket being coupleable to said ball and when so coupled, said pins engage respective ones of said radially spaced arcuate electrical conductors throughout a variety of horizontal and vertical orientations of said ball with respect to said socket.

16. The improved trailer hitch of claim 15, wherein each pin has a flat lower contact surface.

17. The improved trailer hitch of claim 15, wherein each radially spaced arcuate electrical conductor comprises two arcuate sections with circumferentially extending spacings therebetween.

18. The improved trailer hitch of claim 17, wherein each pin comprises two pins for each arcuate section of each radially spaced arcuate electrical conductor.

19. The improved trailer hitch of claim 15, wherein said plurality of radially spaced arcuate electrical conductors comprises four radially spaced circumferentially extending conductors, and further including one pin for each conductor, each pin-conductor set facilitates conveyance of electrical current to one of brake lights, tail lights, turning signals or backing lights, and projections on said shoulder on said another vehicle; and recesses on said collar engaging to maintain electrical contact between respective pins and conductors.

* * * * *